(12) United States Patent
Olarig et al.

(10) Patent No.: US 11,693,969 B2
(45) Date of Patent: Jul. 4, 2023

(54) SYSTEM AND METHOD FOR PROVIDING SECURITY PROTECTION FOR FPGA BASED SOLID STATE DRIVES

(71) Applicant: SAMSUNG ELECTRONICS CO., LTD., Suwon-si (KR)

(72) Inventors: Sompong Paul Olarig, Pleasanton, CA (US); Wentao Wu, Milpitas, CA (US); Jason Martineau, Milpitas, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 114 days.

(21) Appl. No.: 17/320,083

(22) Filed: May 13, 2021

(65) Prior Publication Data

US 2021/0279335 A1 Sep. 9, 2021

Related U.S. Application Data

(62) Division of application No. 16/197,237, filed on Nov. 20, 2018, now Pat. No. 11,030,316.
(Continued)

(51) Int. Cl.
*G06F 21/71* (2013.01)
*G06F 21/62* (2013.01)
(Continued)

(52) U.S. Cl.
CPC .......... *G06F 21/572* (2013.01); *G06F 21/79* (2013.01); *H04L 9/0825* (2013.01);
(Continued)

(58) Field of Classification Search
None
See application file for complete search history.

(56) References Cited

U.S. PATENT DOCUMENTS 7,200,758 B2  4/2007  Zimmer
8,417,774 B2  4/2013  Flynn et al.
(Continued)

FOREIGN PATENT DOCUMENTS

EP  2711858 B1 * 3/2015  .......... G06F 21/572

OTHER PUBLICATIONS

CN 109583189. English Translation. (Year: 2018).*
Feng (Year: 2007), "FPGA/ASIC based Cryptographic Object Store System," IEEE Xplore.

*Primary Examiner* — Venkat Perungavoor
(74) *Attorney, Agent, or Firm* — Lewis Roca Rothgerber Christie LLP

(57) ABSTRACT

According to some example embodiments, a method for providing security to a storage device includes receiving, by the storage device, a public key via a network; sending, by the storage device, the received public key and a proposed configuration corresponding to the storage device to a security manager that resides in a control plane of the network; determining, by the security manager, whether the public key received from the storage device matches a private key available to the security manager; downloading, by the security manager, the proposed configuration to the storage device; determining, by the security manager, if the proposed configuration is successfully downloaded to the storage device; operating the storage device according to the downloaded configuration; and granting, by the security manager, a request to lease the storage device operating in the downloaded configuration for a time interval.

20 Claims, 5 Drawing Sheets

Related U.S. Application Data

(60) Provisional application No. 62/733,995, filed on Sep. 20, 2018.

(51) Int. Cl.
    *G06F 21/57*     (2013.01)
    *G06F 21/79*     (2013.01)
    *H04L 9/08*      (2006.01)
    *H04L 41/082*    (2022.01)
    *H04L 9/40*      (2022.01)
    *H04L 67/00*     (2022.01)
    *G06F 21/76*     (2013.01)

(52) U.S. Cl.
    CPC ......... *H04L 41/082* (2013.01); *H04L 63/062* (2013.01); *H04L 63/108* (2013.01); *H04L 67/34* (2013.01)

(56) References Cited

U.S. PATENT DOCUMENTS

| | | | |
|---|---|---|---|
| 9,165,143 B1* | 10/2015 | Sanders | G06F 21/575 |
| 9,600,370 B2 | 3/2017 | Chiu et al. | |
| 9,930,051 B1* | 3/2018 | Potlapally | H04L 63/126 |
| 10,762,244 B2 | 9/2020 | Fender et al. | |
| 2005/0027994 A1* | 2/2005 | Sai | G06F 21/10 |
| | | | 713/189 |
| 2012/0072734 A1* | 3/2012 | Wishman | G06F 21/64 |
| | | | 713/189 |
| 2017/0083457 A1 | 3/2017 | Khemani et al. | |
| 2018/0083854 A1 | 3/2018 | Munjal et al. | |
| 2018/0165455 A1 | 6/2018 | Liguori et al. | |
| 2019/0102539 A1* | 4/2019 | Durham | G06F 9/45554 |
| 2020/0257828 A1* | 8/2020 | Durham | H04L 9/0822 |

\* cited by examiner

SYSTEM AND METHOD FOR PROVIDING SECURITY PROTECTION FOR FPGA BASED SOLID STATE DRIVES

CROSS-REFERENCE TO RELATED APPLICATION(S)

This application is a divisional application of U.S. patent application Ser. No. 16/197,237, filed Nov. 20, 2018, which claims priority to and the benefit of U.S. Provisional Patent Application Ser. No. 62/733,995, filed Sep. 20, 2018 and entitled "SYSTEM METHOD FOR BMC AS SECURITY MANAGER PROVIDING SECURITY PROTECTION FOR FPGA+ SOLID STATE DRIVES," the entire content of each of which is hereby expressly incorporated by reference.

FIELD

One or more aspects of embodiments according to the present invention relate to storage devices, for example, a system and a method for providing security protection for Field Programmable Gate Array (FPGA) based Solid State Drives (SSDs).

BACKGROUND

A typical Ethernet SSD (eSSD) has a U.2 connector to interface with a system via a mid-plane over the Peripheral Component Interconnect Express (PCIe) bus. U.2 (e.g., small form factor (SFF)-8639) is a computer interface for connecting SSDs to a computer. A U.2 connector can support one Serial Advanced Technology Attachment (SATA) port, two Serial Attached SCSI (SAS) ports or up to four lanes (X4) of parallel input/output (I/O) in the PCIe SSDs. The U.2 connector is standardized for Non-volatile memory (NVM) express (NVMe) and supports PCIe 3.0 ×4, providing five times the speed of a typical SATA SSD.

The above information disclosed in this Background section is only for enhancement of understanding of the background of the invention and therefore it may contain information that does not constitute prior art.

SUMMARY

This summary is provided to introduce a selection of features and concepts of embodiments of the present disclosure that are further described below in the detailed description. This summary is not intended to identify key or essential features of the claimed subject matter, nor is it intended to be used in limiting the scope of the claimed subject matter. One or more of the described features may be combined with one or more other described features to provide a workable device.

Aspects of example embodiments of the present disclosure relate to a system and a method for providing security protection for FPGA based SSDs.

According to some example embodiments according to the present disclosure, a method for providing security to a storage device includes receiving, by the storage device, a public key via a network; sending, by the storage device, the received public key and a proposed configuration corresponding to the storage device to a security manager that resides in a control plane of the network; determining, by the security manager, whether the public key received from the storage device matches a private key available to the security manager; downloading, by the security manager, the proposed configuration to the storage device; determining, by the security manager, if the proposed configuration is successfully downloaded to the storage device; operating the storage device according to the downloaded configuration; and granting, by the security manager, a request to lease the storage device operating in the downloaded configuration for a time interval.

According to some example embodiments, the public key is received by the storage device from a host device; where the method further includes determining, by the security manager, based on determining that the public key received from the storage device matches the private key available to the security manager, whether or not the proposed configuration corresponding to the storage device matches with an allowable configuration of the storage device, where the proposed configuration is downloaded based on determining that the proposed configuration corresponding to the storage device matches the allowable configuration of the storage device. According to some example embodiments, the security manager determines whether the proposed configuration corresponding to the storage device matches the allowable configuration of the storage device using a storage device configuration table available to the security manager.

According to some example embodiments, the storage device configuration table is a field programmable gate array (FPGA) configuration table available to the security manager. According to some example embodiments, if the security manager determines that the public key received from the storage device does not match the private key available to the security manager and/or the proposed configuration corresponding to the storage device does not match the allowable configuration of the storage device, the security manager terminates a request from the host device to lease the storage device. According to some example embodiments, the storage device is a field programmable gate array (FPGA) solid state drive (SSD), the security manager is a baseband management controller (BMC), the host device is an authority server, and the network is Ethernet.

According to some example embodiments, the downloading by the security manager, further includes downloading, by the security manager to the storage device, user specific bitfiles and firmware corresponding to the proposed configuration. According to some example embodiments, the method further includes determining, by the security manager, if the time interval granted to lease the storage device is expired; issuing, by the security manager, based on determining that the time interval granted to lease the storage device is expired, a command to delete the user specific bitfiles and firmware download to the storage device; determining, by the security manager, whether the user specific bitfiles and firmware are successfully deleted from the storage device leased for the time interval; and determining, by the security manager, based on determining that the user specific bitfiles and firmware are successfully deleted from the storage device, the storage device is ready to be leased by a new user.

According to some example embodiments, a system includes a storage device configured to receive a public key, and send the received public key and a proposed configuration corresponding to the storage device to a security manager that resides in a control plane of a network; and the security manager configured to determine whether the public key received from the storage device matches a private key available to the security manager, and download the proposed configuration to the storage device.

According to some example embodiments, the public key is received by the storage device from a host device and where the security manager is further configured to grant a request from one or more users via the host device to lease the storage device operating in the downloaded configuration for a time interval. According to some example embodiments, the storage device is a field programmable gate array (FPGA) solid state drive (SSD), the security manager is a baseband management controller (BMC), the host device is an authority server, and the network is Ethernet. According to some example embodiments, the security manager is further configured to download user specific bitfiles and firmware corresponding to the proposed configuration to the storage device. According to some example embodiments, the security manager is further configured to delete the user specific bitfiles and firmware download to the storage device when the time interval granted to lease the storage device is expired.

According to some example embodiments, the security manager is further configured to determine, based on determining that the public key received from the storage device matches the private key available to the security manager, whether the proposed configuration corresponding to the storage device matches with an allowable configuration of the storage device. According to some example embodiments, the proposed configuration is downloaded based on determining that the proposed configuration corresponding to the storage device matches the allowable configuration of the storage device. According to some example embodiments, the security manager determines whether the proposed configuration corresponding to the storage device matches the allowable configuration of the storage device using a storage device configuration table available to the security manager. According to some example embodiments, the storage device configuration table is a field programmable gate array (FPGA) configuration table available to the security manager. According to some example embodiments, if the security manager determines that the public key received from the storage device does not match the private key available to the security manager and/or the proposed configuration corresponding to the storage device does not match the allowable configuration of the storage device, the security manager terminates a request to lease the storage device.

According to some example embodiments, a method includes receiving an encrypted key via a network; determining, at a security manager, if the received encrypted key is valid by using a private key available to the security manager; receiving, at the security manager, an encrypted image; determining, at the security manager, if the received encrypted image is safe to download, where the security manager is configured to download the encrypted image to a storage device; downloading, by the security manager, the encrypted image; receiving, an assigned key to decrypt the encrypted image, where the assigned key is received at the storage device; and decrypting the encrypted image with the assigned key, where the storage device decrypts the assigned key.

According to some example embodiments, the determining further includes verifying that a storage device configuration corresponding to the encrypted image matches an allowable configuration of the storage device, the downloading further includes saving the downloaded encrypted image at one or more flash memories of the storage device, the encrypted key and the encrypted image are received at the security manager from an authority server, the storage device retrieves the encrypted image from the one or more flash memories of the storage device, and the storage device is a field programmable gate array (FPGA) solid state drive (SSD), the security manager is a baseband management controller (BMC), the network is Ethernet, and the one or more flash memories are NANDs.

According to some example embodiments, the method further includes accessing, by the authority server, data stored at the storage device; transferring, by the security manager, the data stored at the storage device to the authority server; encrypting the data and storing the encrypted data to the one or more flash memories of the storage device by the security manager; and decrypting, by the security manager, the encrypted data.

BRIEF DESCRIPTION OF THE DRAWINGS

These and other features of some example embodiments of the present invention will be appreciated and understood with reference to the specification, claims, and appended drawings, wherein:

DETAILED DESCRIPTION

Figure 1:
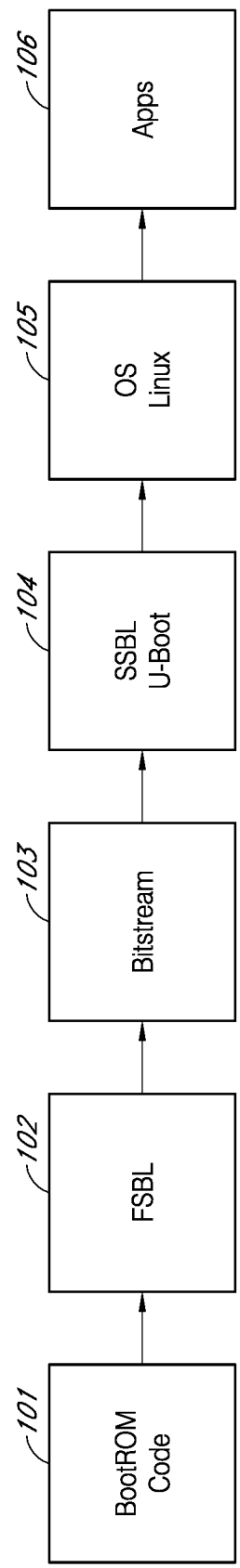
FIG. 1 illustrates a secure boot process.

The detailed description set forth below in connection with the appended drawings is intended as a description of some example embodiments of a system and a method for providing security protection for FPGA based SSDs provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the scope of the invention. As denoted elsewhere herein, like element numbers are intended to indicate like elements or features.

NVMe is a standard that defines a register-level interface for host software to communicate with a non-volatile memory subsystem (e.g., a SSD) over a PCIe bus. NVMe is an alternative to the Small Computer System Interface (SCSI) standard for connecting and transferring data between a host and a peripheral target storage device or system. PCIe-connected NVMe SSDs allow applications to talk directly to storage.

The physical connection of the NVMe is based on a PCIe bus. A typical Ethernet SSD (eSSD) has a U.2 connector to interface with a system via a mid-plane over the PCIe bus. U.2 (e.g., SFF-8639) is a computer interface for connecting SSDs to a computer. A U.2 connector can support one Serial Advanced Technology Attachment (SATA) port, two Serial Attached SCSI (SAS) ports or up to four lanes (×4) of parallel I/O in PCIe SSDs. The U.2 connector is standardized for NVMe and supports PCIe 3.0 ×4, providing five times the speed of a typical SATA SSD.

NVMe over fabrics (NVMe-oF) is an extension to the NVMe standard enabling operation over a variety of fabrics (or interconnects) other than PCIe. Herein, the term "fabric", represents a network topology in which network nodes can pass data to each other through a variety of interconnecting protocols, ports, and switches. For example, Ethernet-attached SSDs may attach directly to a fabric, and in this case the fabric is the Ethernet.

NVMe-oF enables the use of alternate transports to PCIe that extend the distances across which an NVMe host device and NVMe storage drive or subsystem can connect. Therefore, NVMe-oF is a technology specification designed to enable nonvolatile memory express message-based commands to transfer data between a host computer and a target solid-state storage device (e.g., eSSD or NVMe-oF device) or system over a network, such as Ethernet, Fibre Channel (FC) or InfiniBand. When configured to support the NVMe-oF standard, a system can support various fabrics including not only Ethernet, but also, Fibre Channel, InfiniBand, and other network fabrics. For example, eSSDs may attach directly to a fabric, and in this case the fabric is the Ethernet. An eSSD may refer to an SSD that may support the NVMe-oF protocols. For the convenience of illustration, the following examples and embodiments can show an Ethernet-attached NVMe-oF devices. However, it is noted that any other type of NVMe-oF devices can be used without deviating from the scope of the present disclosure.

As mentioned above, the physical connection of the NVMe is based on a PCIe bus. In recent times, with the advent of PCIe 4.0, bandwidth mismatch may be higher than PCIe 3.0. A single 25G Ethernet does not have enough bandwidth to keep up with the backend by ×4 PCIe 4.0 (up to 8 GB/s) from the SSD. A 50G or 100G Ethernet provides a better match for the ×4 PCIe 4.0 from the SSD. Therefore, embodiments of the present invention may include a storage device (e.g., eSSD) that is capable of supporting both NVMe and NVMe-oF protocols, and when in the NVMe-oF mode, the storage device may be able to operate in different Ethernet speeds from 10G up to 100G, without any changes to their hardware.

Further, embodiments of the present invention may enable any platform system to support different types of NVMe-oF devices from different suppliers. By using common building blocks such as switch board, mid-plane and Ethernet SSDs, the eco-system providers may be able to go to market faster than the existing systems and offer various price/performance products to satisfy various customers. Some example embodiments may further enable a common system platform that is capable of supporting NVMe-oF devices with standard U.2 such as PM1725a or PM1735 and new emerging such as M.3 SSDs. In one configuration, the M.3 SSDs may also be called NGSFF based SSDs.

The common building blocks that may support both NVMe and NVMe-oF devices may include a switch board, a mid-plane, and eSSDs. The present system may scale linearly by adding more similar devices and/or chassis. The present system may also provide a common system platform which is capable of supporting NVMe-oF devices with standard U.2 connector such as PM1725a or PM1735 and M.3 or NGSFF based SSDs. The different configurations of the present system may also be compatible with technologies advancement such as 50G and 100G Ethernet and PCIe 4.0.

The fabric-attached SSD (eSSD) disclosed herein is a single common device that may be used in multiple systems compatible with NVMe and NVMe-oF standards. Ethernet SSDs may use U.2 connectors to interface with the host device via the mid-plane. The U.2 connectors may support 25 Gbps (100G-KR4) Ethernet. The eSSD disclosed herein may be a device that may be used in multiple systems compatible with NVMe and NVMe-oF standards. As such, the fabric-attached SSD (eSSD) may also be referred to as a multi-mode NVMe-oF device. The multi-mode NVMe-oF device may support either NVMe or NVMe-oF standard by detecting product information from a known location (e.g., chassis type or protocol selector pin E6 of the motherboard or the mid-plane). If present in NVMe chassis, then the X4 lane PCIe of the U.2 connector will be driven by the PCIe engine. In this case, the device will disable the Fabric attached ports (e.g., Ethernet ports, Fibre-channel ports, or InfiniBand ports) and all NVMe protocols and functionalities are supported or enabled. If present in an NVMe-oF chassis, then the Fabric attached ports will use only the unused SAS pins.

In some example embodiments, FPGA and system-on-a-chip (SoC) (Anti-Tamper) AT solutions disclosed herein may include a physical unclonable function (PUF), user-accessible hardened cryptographic blocks, an asymmetric authentication, a side channel attack protection, and other silicon-based AT features.

A factor that may require consideration is how much of the processing system (PS) or programmable logic (PL) resources are consumed by enabling certain AT features. In some cases, the overall resource penalty may be rather small. However, the consumed PS or PL resources may depend on how the AT features are implemented and the relative sizes of the available FPGA and SoC devices (e.g., larger devices experience less of an impact to their PL resources).

In some example embodiments, the silicon AT features may be classified as either passive or active. In some example embodiments, passive security features are those that are either part of the tool flow or are built into the device and may not require the user to do anything extra in their respective PS/PL design. Passive security features may also be temporal in nature as they come into effect at different times during the normal operating life of the FPGA and SoC devices, for example, a pre-secure boot (for example, black key storage enabled through the PUF), a during-secure boot (for example, resistance to side-channel attacks through differential power analysis (DPA)), and/or a post-secure boot (for example, user data protection through disabling the PL read back).

In some example embodiments, appropriate passive AT security features (for example, image/bit stream encryption and authentication) may be included into when designing the FPGA and SoC devices. The security features may not affect the function of the design. However, in some example embodiments, the security features may create logistical challenges (for example, key management), system challenges (for example, a battery is needed if using battery-backed Random Access Memory (RAM) (BBRAM) for key storage), and increase the secure boot time (for example, using public key authentication may increase the secure boot time). In some other example embodiments, the security features may be freely available in terms of impact to the design and may provide a fair amount of tamper protection. For an already fielded system or a design in the late development stage, these AT features may be appropriate for enabling because they do not affect the software or hardware designs.

Some example embodiments may offer several security features to protect the storage devices from being compromised and/or attacked from a malicious code. However, such security features may require a significant involvement from the end user, especially when the end user wishes to update the FPGA bitfiles or firmware.

FIG. 1 illustrates the example steps in a secure boot process that maintains a chain of trust, assuming each component is either immutable (for example, BootRom code) or is properly authenticated. In the secure boot process of FIG. 1, Root of Trust is provided by the hardware services including cryptographic support, secure key storage, secure signature storage, and secure access to trusted functions. This allows the creation of a trusted module forming the basis, or root, for validating other components within the system.

At 101 of FIG. 1, the initial code BootRom is contained within the processor and may not be changed (e.g., due to it being read-only memory). The BootRom of 101 decrypts the First Stage Boot Loader (FSLB) of the next stage 102 and verifies the integrity of FSLB before the BootRom executes any code of the next stage (e.g., 102). At 103, Bitstream is validated, at 104, Second Stage Boot Loader (SSBL) U-Boot is validated, at 105, the Linux operation system (OS) is validated, and at 106, the applications are validated, thus creating a chain of trusted elements. U-Boot is an open source Universal Boot Loader that is frequently used in the Linux community. In some example embodiments, the integrity of each step may be verified using the keys on the device, which may require a corresponding private key.

In some example embodiments, however, the secure chain protection may consume significant FPGA resources and may take a significant amount of time to complete. Also, in some example embodiments, the secure chain security features may not offer significant advantages for hyper-scalers such as Amazon Web Services (AWS), Microsoft Azure, Google Cloud Services etc. However, the cloud service providers may not have to worry about physical attack on the machines or the FPGA devices because their devices are located in very secure datacenters. Also, in some example embodiments, some of the security features may assume no sharing of the encryption keys, which may not work well with the cloud service providers, as the cloud service provider's main concerns are more IO determinism and lower latencies since they make most of their profit from leasing their computing, storage, and networking resources to their customers. From the cloud service provider's customers' perspective, the customers may want to start running their applications on the leased resources from the cloud service providers as quickly as possible. The customers may not have the time and may not be willing to spend the efforts to ensure that their new bitfiles/firmware/applications are compliant to FPGA vendor's secure boot and/or security features. Moreover, the secure chain security features as discussed above covers fixed function devices and solutions. However, security features tailored for FPGA based SSDs deployed by datacenters may have to support various functions or use cases for each leaser.

What is needed is a better way of providing security for the customers of the cloud service providers without requiring the customers to go through a secure boot chain of trust, since the customers do not own the leased equipment (e.g., FPGA SSD) directly. Moreover, a secure method for the Baseband Management Controller (BMC) to operate as a security intermediary between the FPGA based storage devices (e.g., FPGA SSD) and the client, approving the use of the FPGA for the client on behalf of the system administrator or manager may be desired.

By using the BMC as a security manager for FPGAs and SSDs with FPGAs may ensure that the users of the FPGA based storage devices (e.g., SSDs) are authentic, and that the users only run approved (or at least non-malicious) FPGA configurations and operations. The BMC is ideal for this purpose, because it is located on the motherboard and interacts between the system administrator and the FPGA SSDs at connection or ownership establishing time.

In some example embodiments, the BMC may receive security credentials from a host (e.g. a public key) or a system administrator (e.g., a private key representing ownership of the computing resources), and then approve an FPGA SSD for use by the client (e.g., BMC to validate the proposed FPGA configuration, or that it can be supported by the system). The BMC may also be called upon to verify an FPGA configuration, or to check out specific FPGA operations or functionality. Further, the BMC may securely clear the FPGA configuration or data when a client ceases to use an FPGA SSD, enhancing security for both the ex-host and the next incoming host.

Figure 2:
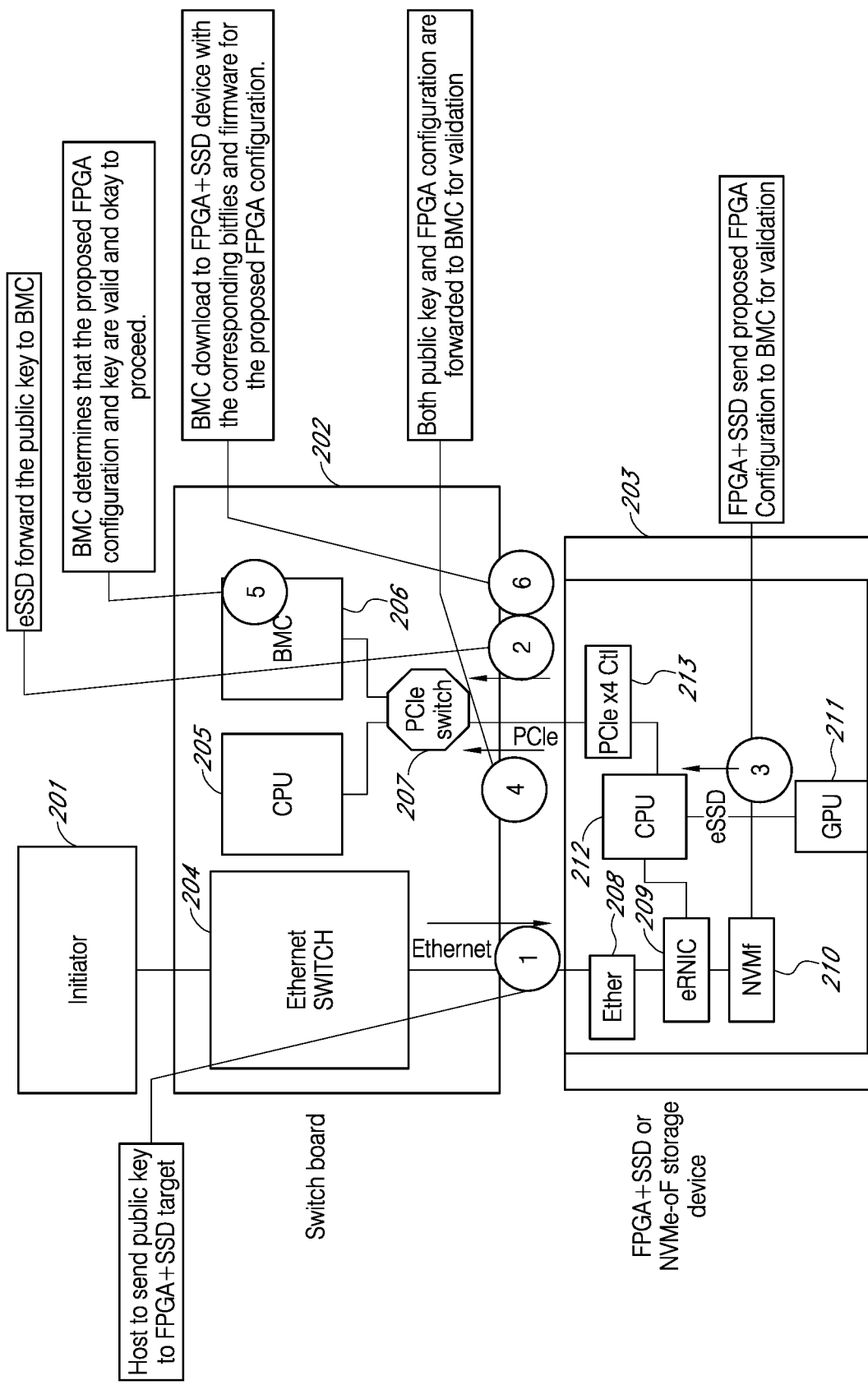
FIG. 2 illustrates a system and a method to use a Baseband Management Controller (BMC) as a security manager for FPGA based SSDs.

FIG. 2 illustrates an example system and method to use BMC as a security manager for the FPGA based SSDs.

The system of FIG. 2 includes an initiator 201, a switch board 202, and a FPGA based SSD 203. The SSD 203 may be an NVMe-oF SSD or eSSD, as the SSD 203 may support the NVMe-oF protocols. The switch board 202 includes an Ethernet switch 204, a central processing unit (CPU) 205, a BMC 206, and a PCIe switch 207. The FPGA SSD 203 includes an Ether module 208 and an Ethernet remote direct memory access (RDMA) enabled network interface card (NIC) (eRNIC) module 209. RDMA is a direct memory access from the memory of one computer into that of another without involving either one's operating system. This permits high-throughput and low-latency networking, which is especially useful in massively parallel computer clusters. The FPGA SSD 203 also includes NVM over fabric (NVMf) module 210, a graphics processing unit (GPU) 211, a CPU 212, and a PCIe ×4 controller 213.

When the BMC is used as a security manager for the FPGA SSD 203, as shown in FIG. 2, at 1, a host device may send a public key to the target FPGA SSD 203, at 2, FPGA SSD 203 may receive the public key from the host device and forward the public key to the BMC 206, at 3, the FPGA SSD 203 may send a proposed FPGA configuration to the BMC 206, at 4, both public key and the proposed FPGA configuration may be forwarded to the BMC 206 for validation, at 5, the BMC 206 determines that the proposed FPGA configuration and the public key are valid by using a private key and a FPGA configuration table available to the BMC 206 to ensure that the proposed FPGA configuration matches with the existing configuration of the FPGA SSD 203. For example, if a customer requests to have a quad application processor and GPU (EG) device, however the FPGA is a dual application processor (CG) Device which may not satisfy the request from the customer, the BMC will notify the user about the FPGA configuration mismatch. At 5, once the validation is complete, the BMC 206 may determine that it is safe to proceed with the proposed FPGA configuration. At 6, the BMC 206 may download to the FPGA SSD 203, the user specific bitfiles and firmware corresponding to the proposed FPGA configuration. As such, the example embodiments of the present disclosure may provide an improved security for the FPGA SSD devices that are being leased for use by the customers, by providing an authentication via a private control plane where the BMC 206 resides, instead of providing an authentication via a public data plane, which is prone to malicious attacks such as Denial-of-Service (DoS) attack.

The different example embodiments of the present disclosure may enable the web service providers to validate and authenticate the user or the leaser to ensure that the leased equipment including the FPGA SSDs are capable of providing desired feature sets before allowing a customer or an user to download the user specific FPGA bitfiles, which may be time consuming. Moreover, the different example embodiments of the present disclosure use BMC (e.g., BMC 206) to authenticate the leaser or the user, and validate the proposed FPGA configuration that may be supported by the selected or assigned FPGA SSDs (e.g., FPGA SSD 203) with no incremental cost, as the BMC (e.g., BMC 206) is capable of accessing all the SSDs (e.g., FPGA SSD 203) in a chassis. Further, the different example embodiments of the present disclosure may prevent the customers or the users from having unexpected issues with the FPGA and its proprietary bitfiles. Also, the different example embodiments of the present disclosure may enable the BMC (e.g., BMC 206) to sanitize or zeroize all the lease expired FPGA SSDs used by the last customer before letting a new user to use them.

Figure 3A:
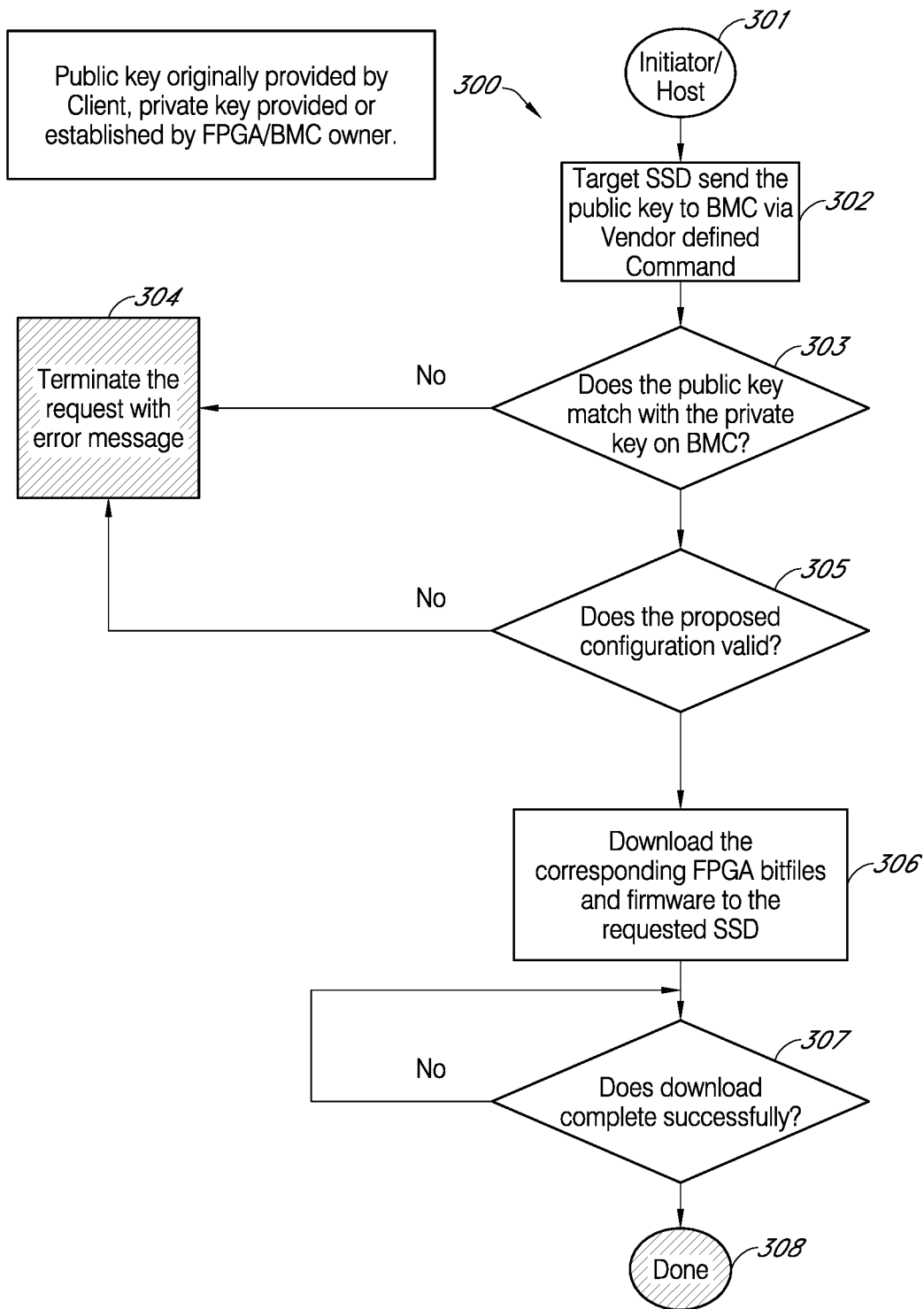
FIG. 3A illustrates a flowchart of an example method for providing security to FPGA based SSDs using a BMC as a security manager.

FIG. 3A illustrates a flowchart of an example method 300 for providing security to a FPGA based SSD using BMC as a security manager.

At 301, an initiator or a host device may send a public key to a target FPGA SSD (e.g., 203). At 302, the FPGA SSD (e.g., 203) forwards the received public key from the host device to the BMC (e.g., 206) via a vendor defined command. In some example embodiments, the FPGA SSD (e.g., 203) may also send a proposed FPGA configuration to the BMC (e.g., 206). At 303, the BMC (e.g., 206) determines whether the public key received from the target FPGA SSD (e.g., 203) matches a private key available to the BMC (e.g., 206). If so, at 305 the BMC (e.g., 206) further determines whether the proposed FPGA configuration is valid using a FPGA configuration table available to the BMC (e.g., 206) to ensure that the proposed FPGA configuration matches with the existing configuration of the FPGA SSD (e.g., 203). However, at 303, if the BMC (e.g., 206) determines that the public key received from the target FPGA SSD (e.g., 203) does not match (or able to pair with) the private key available to the BMC (e.g., 206), at 304, the BMC (e.g., 206) terminates the request from the host device to lease the FPGA SSD (e.g., 203) with an error message. Also, at 305, if the BMC (e.g., 206) determines that the proposed FPGA configuration is not valid, the BMC (e.g., 206) terminates the request from the host device to lease the FPGA SSD (e.g., 203) with an error message (e.g., 304).

If at 305 the BMC (e.g., 206) determines that the proposed FPGA configuration is valid, at 306, the BMC (e.g., 206) may determine that it is safe to proceed with the proposed FPGA configuration and may download to the target FPGA SSD (e.g., 203) the user specific FPGA bitfiles and firmware corresponding to the proposed FPGA configuration. At 307, the BMC (e.g., 206) determines if the proposed FPGA configuration is successfully downloaded to the FPGA SSD (e.g., 203). Once the proposed FPGA configuration is successfully downloaded to the target FPGA SSD (e.g., 203), the FPGA SSD (e.g., 203) may operate in the downloaded FPGA configuration. At 308, the process 300 ends. In some configurations, at 308, the BMC (e.g., 206) may grant a request from the host device to lease the FPGA SSD (e.g., 203) and therefore the FPGA SSD may be assessed by the user or the host device.

Therefore, the method 300 of FIG. 3A may provide improved security for FPGA SSD devices being leased for use by the customers by providing an authentication via the private control plane where the BMC resides instead of providing an authentication via the public data plane, which are prone to the malicious attacks.

Figure 3B:
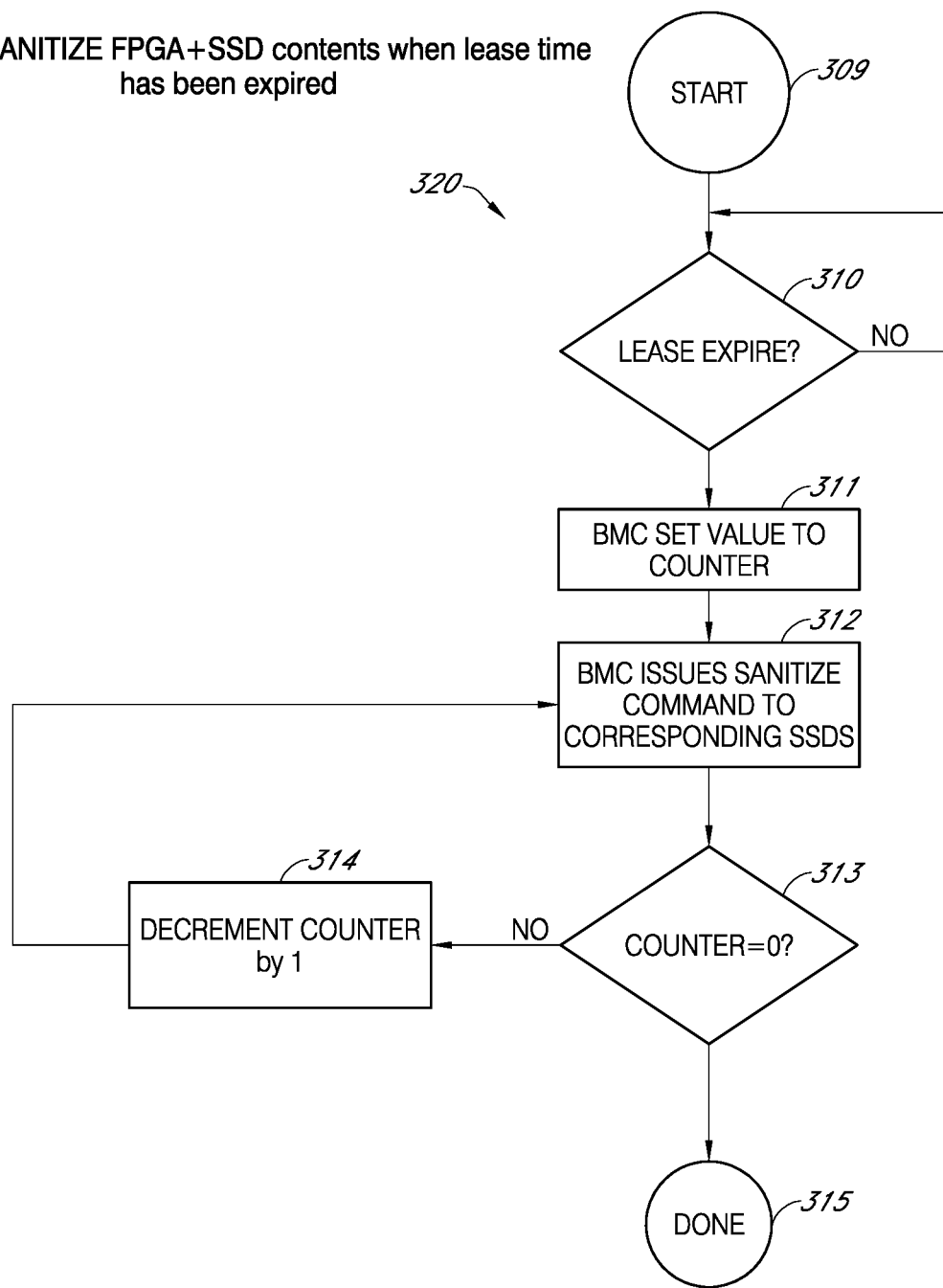
FIG. 3B illustrates a flowchart of an example method performed by a BMC security manager to sanitize a target FPGA SSD.

FIG. 3B illustrates a flowchart of an example method 320 performed by a BMC security manager to sanitize a target FPGA SSD once the lease time of the FPGA SSD has been expired.

The method 320 starts at 309. At 310, the BMC (e.g., 206) determines if the lease time of the FPGA SSD (e.g., 203) has been expired. If so, at 311, the BMC (e.g., 206) set a value (e.g., a predetermined value) to a counter. At 312, the BMC (e.g., 206) issues a command to sanitize the target FPGA SSD (e.g., 203) that was leased by a user. In some example embodiments, the sanitizing command may delete the user specific FPGA bitfiles and the firmware download to the target FPGA SSD (e.g., 203). At 313, the BMC (e.g., 206) determines if the counter value is equal to zero. The counter value equal to zero may indicate that the user specific FPGA bitfiles and the firmware are successfully deleted from the FPGA SSD (e.g., 203) that was leased by the user. If so, the method 320 of sanitizing the target FPGA SSD (e.g., 203) ends at 315, as the user specific bitfiles and firmware are successfully deleted from the FPGA SSD (e.g., 203) and the FPGA SSD (e.g., 203) is ready to be leased by a new user. However, if at 313, the BMC (e.g., 206) determines that the counter value is not equal to zero, at 314, the BMC (e.g., 206) decrements the counter by 1 and the method returns to 312. This loop continues until the counter value is zero.

Figure 4:
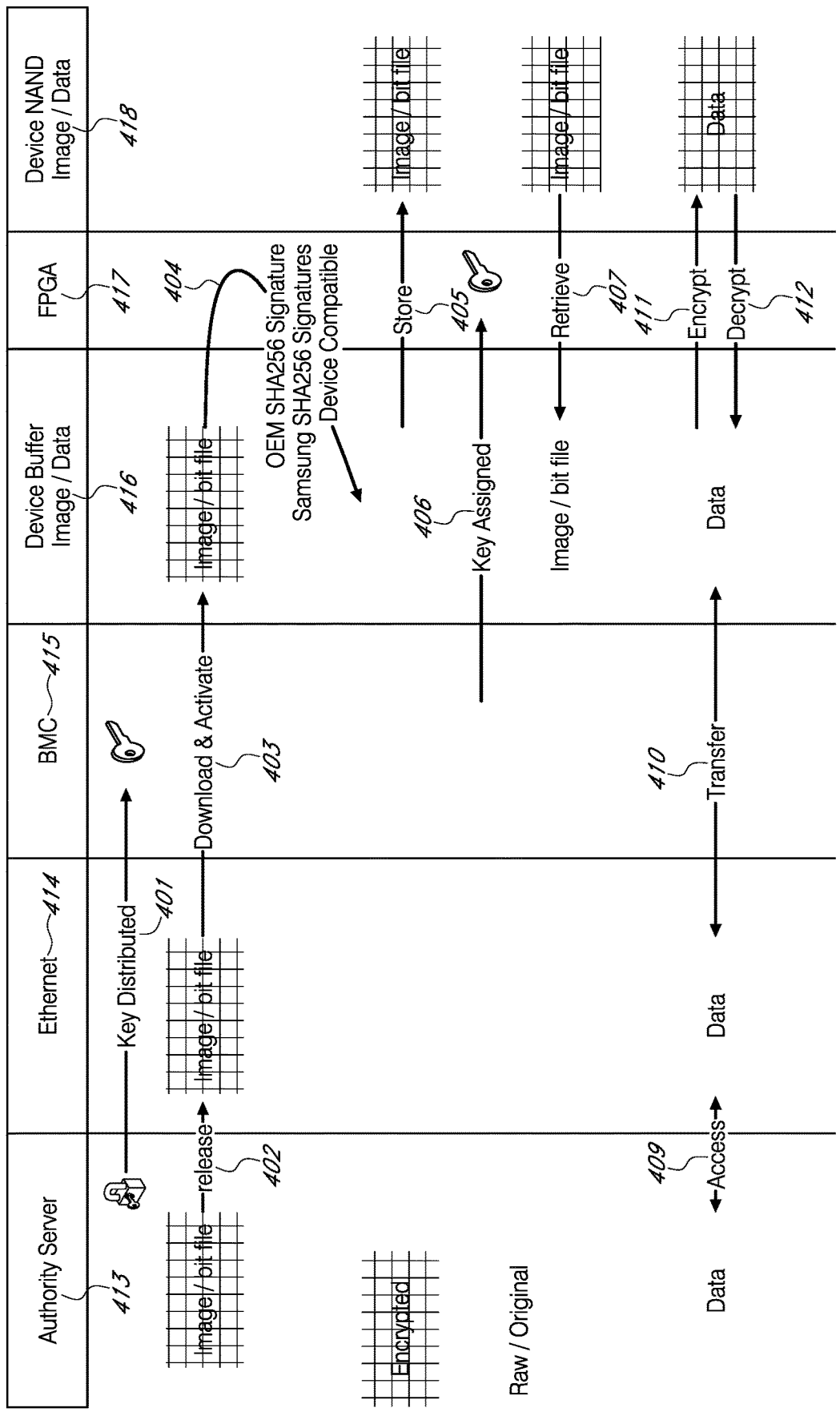
FIG. 4 illustrates an example flow diagram for securely downloading and using an image and data to a FPGA SSD.

FIG. 4 illustrates an example flow diagram for securely downloading and using an image and data to a FPGA SSD. In case of secure download and use of an image from an authority server or a user, at 401, an authority server 413 distributes an encryption key to the BMC 415 (e.g., 206) via the Ethernet 414. In some example embodiments, once the encryption key from the authority server 413 is received at the BMC at 401, the BMC 415 may determine that the encryption key is valid by using a private key available to the BMC 206. At 402, the authority server 413 releases an encrypted image to the BMC 415, and at 403 the authority server 413 sends a command to the BMC 415 to download and activate the encrypted image to the FPGA SSD device buffer 416. At 404, the BMC 415 verifies if the encrypted image from the authority server 413 is safe to download (at 404) to the FPGA SSD 417. For example, the BMC 415 may verify if the encrypted image from the authority server 413 is valid by using a FPGA configuration table available to the BMC 415 to ensure that the proposed FPGA configuration corresponding to the encrypted image from the authority server 413 matches with the existing configuration of the FPGA SSD 417. Once the validation is complete, the BMC 415 may determine that it is safe to proceed with the image download at 404. At 405, the BMC 415 may download the encrypted image to the FPGA SSD 417 and save the downloaded encrypted image at the one or more flash memories or NANDs 418 in the FPGA SSD 417. At 406, the FPGA SSD 417 receives an assigned key from the authority server 413 via BMC to decrypt the encrypted image saved at the one or more NANDs 418 of the FPGA SSD 417. At 407, the FPGA SSD 417 retrieves the encrypted image and decrypts the encrypted image with the assigned key which is received from the authority server 413 at 406. Once the image is successfully decrypted at 407, the decrypted mage is loaded at the FPGA SSD 417 and may be used by the user who is leasing the FPGA SSD 417.

However, in case of secure download and use of data from an authority server or user, at 409, the authority server 413 accesses the data to or from the FPGA SSD 417, at 410, the data is transferred (e.g., two way transfer) by the BMC 415 from the FPGA SSD device buffer 416 to the authority server 413 via the Ethernet 414. At 411, the data is encrypted and stored in the one or more NANDs 418 of the FPGA SSD 417 by the BMC 415. At 412, the data is decrypted by the BMC 415 when retrieved from the one or more NANDs 418 of the FPGA SSD 417.

As such, the example embodiments of the present disclosure may provide improved security to the FPGA SSD devices that are being leased for use by the customers, by providing an authentication via a private control plane where the BMC resides, instead of providing the authentication via a public data plane, which is prone to malicious attacks.

In some example embodiments, all standard internet protocols (IPs) such as PCIe End Point, PCIe Root Port which are readily available by the FPGA vendors are not protected. The standard IPs are required for the FPGA to perform basic functionalities. In some example embodiments, the different embodiments of the present disclosure may protect the leaser proprietary IPs such as hardware assisted acceleration engines/algorithms etc.

In some example embodiment, in order for the BMC 415 to download the FPGA acceleration bitfiles (e.g., at 404) after the key authentication by the BMC 415, the proprietary FPGA bitfiles may be downloaded by the BMC 415 to the FPGA SSD device 417 to provide an extra security but slightly longer latency compared to the existing security protocols. In some example embodiments, however, the authority server 413 may download and activate (e.g., at 403) the image or bitfiles using Samsung SHA256 Signatures to the one or more NANDs of the FPGA SSD 417. The BMC 415 may provide the key (e.g., at 406) to the FPGA SSD 417 to retrieve the encrypted bit-files (e.g., at 407) from the one or more NANDs of the FPGA SSD 417. Once the bit files (e.g., at 407) are retrieved from the one or more NANDs of the FPGA SSD 417, the FPGA SSD 417 may have the hardware acceleration IP or engine downloaded and ready to be used by the user who has a current lease in the FPGA SSD 417.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present invention". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Although exemplary embodiments of a system and a method for providing security protection for FPGA based SSDs have been specifically described and illustrated herein, many modifications and variations will be apparent to those skilled in the art. Accordingly, it is to be understood that to a system and a method for providing security protection for FPGA based SSDs constructed according to principles of this invention may be embodied other than as specifically described herein. The invention is also defined in the following claims, and equivalents thereof

What is claimed is:

1. A method comprising:
receiving, at a controller, an encrypted key via a network to generate a received encrypted key;
determining, by the controller, that the received encrypted key is valid by using a private key available to the controller;
receiving, at the controller, an encrypted image via the network to generate a received encrypted image;
downloading, by the controller, the received encrypted image to a storage device connected to the controller;
receiving, at the storage device via the network, an assigned key to decrypt the received encrypted image; and
decrypting, by the storage device, the received encrypted image with the assigned key.

2. The method of claim 1 wherein the encrypted key, the encrypted image, and the assigned key are received at the controller from a server via Ethernet.

3. The method of claim 1, wherein the controller downloads the received encrypted image to the storage device based on determining that the received encrypted image is safe to download to the storage device connected to the controller.

4. The method of claim 3, wherein the determining at the controller that the received encrypted image is safe to download to the storage device comprises:
receiving, by the controller from a server, a command to download and activate the received encrypted image to the storage device connected to the controller.

5. The method of claim 4, wherein the determining at the controller that the received encrypted image is safe to download to the storage device further comprises:
verifying that a proposed storage device configuration corresponding to the received encrypted image matches an allowable configuration of the storage device.

6. The method of claim 5, wherein the determining at the controller that the received encrypted image is safe to download to the storage device further comprises:
verifying that the received encrypted image from the server is valid by using a storage device configuration table available to the controller to determine that the proposed storage device configuration corresponding to the received encrypted image from the server matches with the allowable configuration of the storage device.

7. The method of claim 6, wherein the storage device configuration table is a field programmable gate array (FPGA) configuration table available to the controller.

8. The method of claim 6, further comprising:
downloading, by the controller, field programmable gate array (FPGA) bitfiles to the storage device to provide an extra security to an existing security protocols of the storage device.

9. The method of claim 1, wherein the downloading further comprises:
saving the received encrypted image at one or more flash memories of the storage device.

10. The method of claim 9, wherein decrypting the received encrypted image comprises:
retrieving, by the storage device, the received encrypted image from the one or more flash memories of the storage device, wherein the one or more flash memories of the storage device are NOT-AND (NAND) flash memories.

11. The method of claim 1, wherein the storage device is a field programmable gate array (FPGA) solid state drive (SSD), the controller is a baseband management controller (BMC), and the network is Ethernet.

12. The method of claim 1, further comprising:
accessing, by a server via the controller, data stored at the storage device;
transferring, by the controller, the data stored at the storage device to the server;
encrypting the data and storing the encrypted data to one or more flash memories of the storage device by the controller; and
decrypting, by the controller, the encrypted data.

13. A method comprising:
receiving, at a controller, an encrypted key via a network to generate a received encrypted key;
receiving, at the controller, an encrypted image to generate a received encrypted image;
downloading, by the controller, the received encrypted image to a storage device connected to the controller; and
decrypting, by the storage device, the received encrypted image with an assigned key received by the storage device.

14. The method of claim 13, further comprising:
determining, at the controller, that the received encrypted key is valid by using a private key available to the controller, wherein the encrypted key, the encrypted image, and the assigned key are received at the controller from a server via Ethernet,
wherein the controller downloads the received encrypted image to the storage device based on determining that the received encrypted image is safe to download to the storage device connected to the controller.

15. The method of claim 14, wherein the determining at the controller that the received encrypted image is safe to download to the storage device comprises:
receiving, by the controller from the server, a command to download and activate the received encrypted image to the storage device connected to the controller; and
verifying that a proposed storage device configuration corresponding to the received encrypted image matches an allowable configuration of the storage device.

16. The method of claim 15, wherein the determining at the controller that the received encrypted image is safe to download to the storage device further comprises:
  verifying that the received encrypted image from the server is valid by using a storage device configuration table available to the controller to determine that the proposed storage device configuration corresponding to the received encrypted image from the server matches with the allowable configuration of the storage device, wherein the storage device configuration table is a field programmable gate array (FPGA) configuration table available to the controller; and
  downloading, by the controller, FPGA bitfiles to the storage device to provide an extra security to an existing security protocols of the storage device.

17. The method of claim 13, further comprising:
  accessing, by a server via the controller, data stored at the storage device;
  transferring, by the controller, the data stored at the storage device to the server;
  encrypting the data and storing the encrypted data to one or more flash memories of the storage device by the controller; and
  decrypting, by the controller, the encrypted data, wherein:
    the downloading further comprises saving the received encrypted image at the one or more flash memories of the storage device; and
    the decrypting the received encrypted image comprises retrieving, by the storage device, the received encrypted image from the one or more flash memories of the storage device, wherein the one or more flash memories of the storage device are NOT-AND (NAND) flash memories.

18. The method of claim 17, wherein the storage device is a field programmable gate array (FPGA) solid state drive (SSD), the controller is a baseband management controller (BMC), and the network is Ethernet.

19. A method comprising:
  receiving, at a controller, an encrypted key via a network to generate a received encrypted key;
  determining, by the controller, that the received encrypted key is valid by using a private key available to the controller;
  receiving, by the controller, a command to download and activate an encrypted image to a storage device connected to the controller;
  receiving, at the controller, the encrypted image to generate a received encrypted image;
  determining, by the controller, that the received encrypted image is safe to download to the storage device connected to the controller based on verifying that a proposed storage device configuration corresponding to the received encrypted image matches an allowable configuration of the storage device;
  downloading, by the controller, the received encrypted image to the storage device connected to the controller; and
  decrypting, by the storage device, the received encrypted image with an assigned key received at the controller via the network.

20. The method of claim 19, further comprising:
  saving the received encrypted image at one or more flash memories of the storage device;
  accessing, by a server via the controller, data stored at the storage device;
  transferring, by the controller, the data stored at the storage device to the server;
  encrypting the data and storing the encrypted data to the one or more flash memories of the storage device by the controller; and
  decrypting, by the controller, the encrypted data, wherein the storage device is a field programmable gate array (FPGA) solid state drive (SSD), the controller is a baseband management controller (BMC), and the network is Ethernet.

* * * * *